United States Patent
Lei

(10) Patent No.: US 12,363,584 B2
(45) Date of Patent: *Jul. 15, 2025

(54) CONSERVING NETWORK RESOURCES DURING TRANSMISSION OF PACKETS OF INTERACTIVE SERVICES

(71) Applicant: Tencent Technology (Shenzhen) Company Limited, Guangdong (CN)

(72) Inventor: Yixue Lei, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 179 days.

This patent is subject to a terminal disclaimer.

(21) Appl. No.: 17/986,590

(22) Filed: Nov. 14, 2022

(65) Prior Publication Data

US 2023/0071243 A1    Mar. 9, 2023

Related U.S. Application Data

(63) Continuation of application No. PCT/CN2021/120147, filed on Sep. 24, 2021.

(30) Foreign Application Priority Data

Jan. 4, 2021 (CN) .......................... 202110003821.0

(51) Int. Cl.
  *H04W 28/02* (2009.01)
  *H04L 1/1812* (2023.01)
  *H04W 8/02* (2009.01)

(52) U.S. Cl.
  CPC ....... *H04W 28/0268* (2013.01); *H04L 1/1816* (2013.01); *H04W 8/02* (2013.01)

(58) Field of Classification Search
  CPC . H04W 28/0268; H04W 8/02; H04W 28/065; H04L 1/1816; H04L 47/12; H04L 43/0852; H04L 47/32
  See application file for complete search history.

(56) References Cited

U.S. PATENT DOCUMENTS

2017/0317894 A1    11/2017  Dao et al.
2018/0019903 A1*    1/2018  Hwang .................. H04L 65/611
(Continued)

FOREIGN PATENT DOCUMENTS

CN    106789886 A    5/2017
CN    110062426 A    7/2019
(Continued)

OTHER PUBLICATIONS

Chinese Office Action issued Apr. 9, 2023 in Application No. 202110003821.0, pp. 1-27.

(Continued)

*Primary Examiner* — Justin T Van Roie
(74) *Attorney, Agent, or Firm* — ArentFox Schiff LLP

(57) ABSTRACT

A data transmission method includes receiving policy information transmitted by a core network device and related to a Protocol Data Unit (PDU) session, the policy information instructing transmission delay monitoring to be performed on data sub-packets obtained by splitting a data packet of an interactive service. The method further includes, in response to identifying that a data packet transmitted by a previous node is one of the data sub-packets obtained by splitting the data packet of the interactive service, detecting, according to the policy information in a process of transmitting the data sub-packets to a subsequent node, whether transmission of the data sub-packets meets a delay requirement. The method further includes, in response to detecting that the transmission of the data sub-packets does not meet the delay requirement, stopping transmitting remaining data sub-packets (Continued)

S310 — Receive policy information transmitted by a core network device and related to a PDU session, the policy information being used for instructing transmission delay monitoring to be performed on data sub-packets obtained by splitting a strongly interactive data packet S320 — In response to identifying that a data packet transmitted by a superior node belongs to the data sub-packets obtained by splitting the strongly interactive data packet, detect, according to the policy information in a process of transmitting the data sub-packets obtained by splitting the strongly interactive data packet to a subordinate node, whether transmission of the data sub-packets meets a delay requirement S330 — Stop, in response to detecting that the transmission of the data sub-packets does not meet the delay, transmitting the remaining data sub-packets obtained by splitting the strongly interactive data packet to the subordinate node obtained by splitting the data packet of the interactive service to the subsequent node.

20 Claims, 9 Drawing Sheets

(56) References Cited

U.S. PATENT DOCUMENTS

| | | | |
|---|---|---|---|
| 2019/0159227 | A1 | 5/2019 | Talebi Fard et al. |
| 2019/0222491 | A1 | 7/2019 | Tomkins et al. |
| 2019/0394279 | A1 | 12/2019 | Dao et al. |
| 2020/0145876 | A1 | 5/2020 | Dao et al. |
| 2020/0213897 | A1 | 7/2020 | Qiao et al. |
| 2020/0221527 | A1 | 7/2020 | Bharatia et al. |
| 2023/0060066 | A1* | 2/2023 | Lei ................ H04W 56/0055 |

FOREIGN PATENT DOCUMENTS

| | | |
|---|---|---|
| CN | 111147564 A | 5/2020 |
| CN | 111385221 A | 7/2020 |
| CN | 111758279 A | 10/2020 |
| CN | 112787945 A | 5/2021 |

OTHER PUBLICATIONS

Extended European Search Report and Search Opinion received for European Application No. 21913262.8, mailed on Mar. 28, 2024, 10 pages.

Office Action received for Chinese Patent Application No. 202110003821.0, mailed on Apr. 9, 2023, 16 pages (5 pages of English Translation and 11 pages of Original Document).

International Search Report and Written Opinion in PCT/CN2021/120147, mailed on Dec. 21, 2021, 11 pages.

* cited by examiner

CONSERVING NETWORK RESOURCES DURING TRANSMISSION OF PACKETS OF INTERACTIVE SERVICES

RELATED APPLICATIONS

This application is a continuation of International Application No. PCT/CN20211120147, entitled "DATA TRANSMISSION METHOD AND APPARATUS, AND COMPUTER-READABLE MEDIUM, AND ELECTRONIC DEVICE," filed on Sep. 24, 2021, which claims priority to Chinese Patent Application No. 202110003821.0, entitled "DATA TRANSMISSION METHOD AND APPARATUS, COMPUTER-READABLE MEDIUM, AND ELECTRONIC DEVICE" and filed on Jan. 4, 2021. The entire disclosures of the prior applications are hereby incorporated by reference.

FIELD OF THE TECHNOLOGY

This application relates to the field of communication technology, including a data transmission method and apparatus, a computer-readable medium, and an electronic device.

BACKGROUND OF THE DISCLOSURE

In 5th-Generation (5G) and evolved 5G systems, high-bandwidth strongly interactive businesses are an important business type, such as cloud gaming, Virtual Reality (VR), Augmented Reality (AR), Mixed Reality (MR), Extended Reality (XR), and Cinematic Reality (CR), etc. These strongly interactive services have an extremely high requirement for transmission time. In addition, with the improvement of resolutions, frame rates, degrees of freedom and other indicators, the amount of data generated by an application layer increases greatly. As a result, a great load is brought to network transmission. A data packet content generated by an application layer of this kind of service needs to be cut into a large number of data packet segments for transmission at an extremely low latency. The entire data packet content cannot be restored and presented in real time at a receiving end once the transmission of one of the segments does not meet a transmission requirement, so that the requirements of the high-bandwidth strongly interactive services cannot be met. In view of this application scenario, how to ensure that occupancy of transmission resources can be reduced as much as possible during transmission of a data packet of strongly interactive services is a technical problem that needs to be solved urgently.

SUMMARY

Embodiments of this disclosure provide a data transmission method and apparatus, a computer-readable medium, and an electronic device.

In an embodiment, a data transmission method includes receiving policy information transmitted by a core network device and related to a Protocol Data Unit (PDU) session, the policy information instructing transmission delay monitoring to be performed on data sub-packets obtained by splitting a data packet of an interactive service. The method further includes, in response to identifying that a data packet transmitted by a previous node is one of the data sub-packets obtained by splitting the data packet of the interactive service, detecting, according to the policy information in a process of transmitting the data sub-packets to a subsequent node, whether transmission of the data sub-packets meets a delay requirement. The method further includes, in response to detecting that the transmission of the data sub-packets does not meet the delay requirement, stopping transmitting remaining data sub-packets obtained by splitting the data packet of the interactive service to the subsequent node.

In an embodiment, a data transmission apparatus comprises processing circuitry configured to receive policy information transmitted by a core network device and related to a Protocol Data Unit (PDU) session, the policy information instructing transmission delay monitoring to be performed on data sub-packets obtained by splitting a data packet of an interactive service. The processing circuitry is further configured to, in response to identifying that a data packet transmitted by a previous node is one of the data sub-packets obtained by splitting the data packet of the interactive service, detect, according to the policy information in a process of transmitting the data sub-packets to a subsequent node, whether transmission of the data sub-packets meets a delay requirement. The processing circuitry is further configured to, in response to detecting that the transmission of the data sub-packets does not meet the delay requirement, stop transmitting remaining data sub-packets obtained by splitting the data packet of the interactive service to the subsequent node.

In an embodiment, a non-transitory computer-readable storage medium stores computer-readable instructions thereon, which, when executed by a processing circuitry, cause the processing circuitry to perform a data transmission method. The data transmission method includes receiving policy information transmitted by a core network device and related to a Protocol Data Unit (PDU) session, the policy information instructing transmission delay monitoring to be performed on data sub-packets obtained by splitting a data packet of an interactive service. The method further includes, in response to identifying that a data packet transmitted by a previous node is one of the data sub-packets obtained by splitting the data packet of the interactive service, detecting, according to the policy information in a process of transmitting the data sub-packets to a subsequent node, whether transmission of the data sub-packets meets a delay requirement. The method further includes, in response to detecting that the transmission of the data sub-packets does not meet the delay requirement, stopping transmitting remaining data sub-packets obtained by splitting the data packet of the interactive service to the subsequent node.

Details of one or more embodiments of this disclosure are provided in the accompanying drawings and descriptions below. Other features, objectives, and advantages of this disclosure are illustrated in the specification, the accompanying drawings, and the claims.

BRIEF DESCRIPTION OF THE DRAWINGS

The accompanying drawings herein, which are incorporated into the specification and constitute a part of this specification, show embodiments that conform to this disclosure, and are used for describing a principle of this disclosure together with this specification. The accompanying drawings in the following description show merely some embodiments of this disclosure, and a person of ordinary skill in the art may still derive other drawings from these accompanying drawings. In the appended drawings.

DESCRIPTION OF EMBODIMENTS

"Plurality of" mentioned herein means two or more. The term and/or describes an association relationship for describing associated objects and represents that three relationships may exist. For example, A and/or B may represent the following three cases: Only A exists, both A and B exist, and only B exists. The character "/" generally indicates an "or" relationship between the associated objects.

With the development of 5th-Generation (5G), many businesses that require a large data volume and a short time delay have been applied. For example, cloud gaming business, VR, AR, MR, XR, CR and other interactive businesses can also be referred to as an Advanced Interactive Service (AIS) business.

Figure 1:
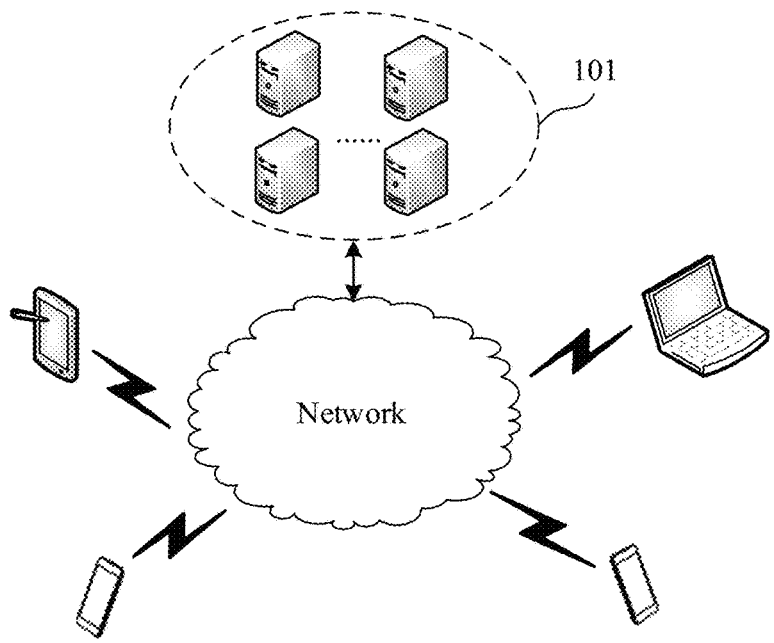
FIG. 1 shows a schematic diagram of an exemplary system architecture to which a technical solution according to an embodiment of this disclosure is applicable.

For example, in a cloud gaming scenario shown in FIG. 1, a cloud server 101 is configured to run a cloud gaming. The cloud server 101 may render game images, encode audio signals and rendered images, and finally transmit the encoded data obtained by encoding processing to each game client through a network. The game client may be a user equipment with a basic streaming media playback capability, human-machine interaction capability and communication capability, such as a smart phone, a tablet computer, a laptop computer, a desktop computer, or a smart TV, etc.; or, the game client may be an application program running in a terminal device. Specifically, the game client may decode the encoded data transmitted by the cloud server 101 to obtain analog audio and video signals, and play the same. It is understood that FIG. 1 is only an exemplary system architecture representing a cloud gaming system, and does not limit the specific architecture of the cloud gaming system. For example, in other embodiments, the cloud gaming system may also include a background server for scheduling and the like. The cloud server 101 may be an independent physical server, or may be a server cluster or a distributed system formed by a plurality of physical servers, or may be a cloud server that provides a basic cloud computing service such as a cloud service, a cloud database, cloud computing, a cloud function, cloud storage, a network service, cloud communication, a middleware service, a domain name service, a security service, a content delivery network (CDN), big data, and an artificial intelligence platform. The game client and the cloud server 101 may be directly or indirectly connected in a wired or wireless communication manner. This is not limited in this disclosure.

Figure 2:
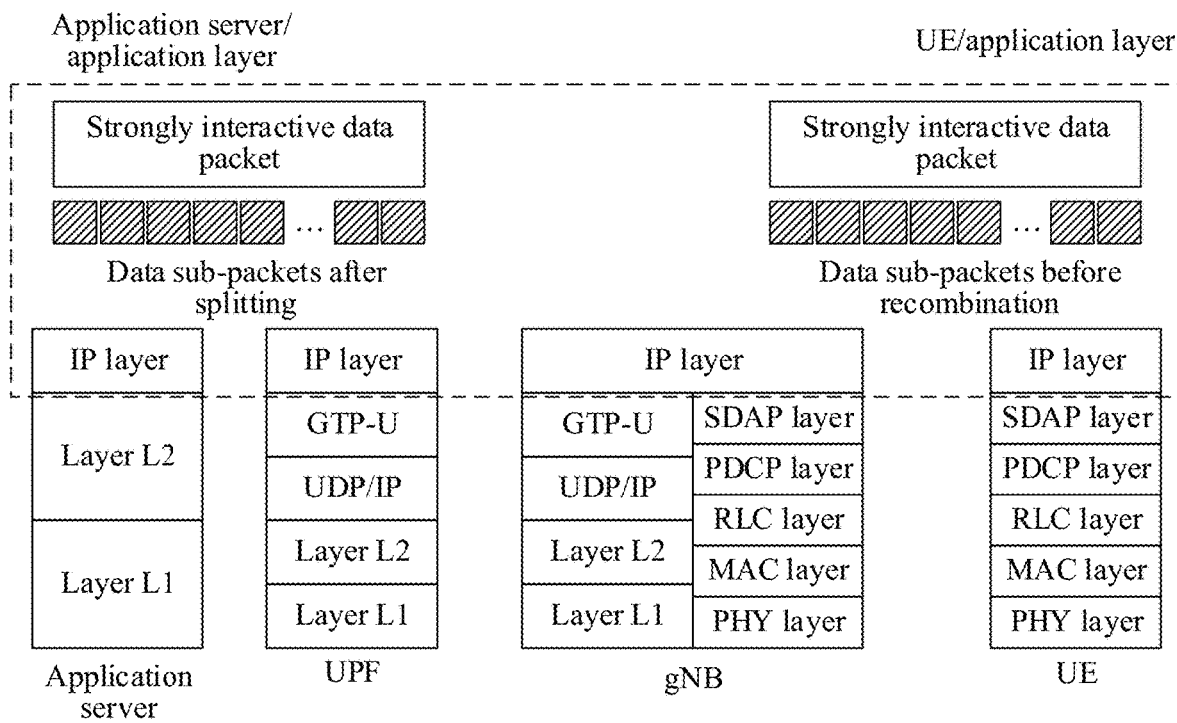
FIG. 2 shows a schematic diagram of a transmission process of a strongly interactive data packet according to one embodiment of this disclosure.

In the above application scenarios of various strongly interactive businesses, a strongly interactive data packet needs to be split into a plurality of data sub-packets during transmission since it is huge. Specifically, as shown in FIG. 2, in a 5G system, a user plane mainly includes an application server, a User Plane Function (UPF), a next generation nodeB (gNB) and a User Equipment (UE). The strongly interactive data packet is mainly transmitted in a downlink direction in some typical business scenarios, such as from the application server to the UPF, and then from the gNB to the UE. During transmission, the strongly interactive data packet is split at an application layer of the application server. After the data sub-packets after splitting arrive at the UPF from the application server as Internet Protocol (IP) packets, the 5G system transmits the data sub-packets to the UE through a Protocol Data Unit (PDU) session. The data sub-packets are upwards submitted step by step from a protocol stack at the UE, and are then recombined to restore the strongly interactive data packet.

In the system shown in FIG. 2, layer L1 refers to a physical layer, which is used for ensuring that original data can be transmitted on various physical media; layer L2 refers to a data link layer, which provides a service to a network layer on the basis of a service provided by the physical layer; an IP layer is a network layer, used for achieving data transmission between two end systems; UDP is user datagram protocol; GTP-U is general packet radio service tunneling protocol; PHY is physical, which is referred to as physical layer in Chinese; MAC is media access control; RLC is radio link control; PDCP is packet data convergence protocol; and SDAP is service data adaptation protocol.

In the aforementioned application scenario, the strongly interactive data packet generated by the application layer needs to be split into a large number of data sub-packets for transmission at an extremely short time delay. Once the transmission of one of the data sub-packets does not meet transmission requirements, the entire strongly interactive data packet cannot be restored and presented in real time at a receiving end, thus failing to meet the needs of a strongly interactive high-bandwidth business. In this case, the segmented transmission of a large number of data sub-packets is actually a waste of valuable network resources. Specifically, assuming that a strongly interactive data packet is split into 10 data sub-packets (or even more data sub-packets), and the probability of successful transmission of each of the data sub-packets is 0.99, the probability of successful transmission of all of the 10 data sub-packets is 0.99$^{10}$, namely 0.904. It can be seen that when a strongly interactive data packet is split into multiple data sub-packets, even if the probability of successful transmission of each of the data sub-packets is large, the probability of successful transmission of all the data sub-packets obtained by splitting the entire strongly interactive data packet will be greatly reduced. Not only that, if the transmission of the data sub-packet exceeds a time delay requirement, even if a receiver receives all the data sub-packets obtained by splitting the strongly interactive data packet, there is no need to restore the strongly interactive data packet. In this case, it is meaningless to continue to transmit the data sub-packets obtained by splitting the strongly interactive data packet. Based on this, the embodiments of this disclosure provide the following solutions.

Figure 3:
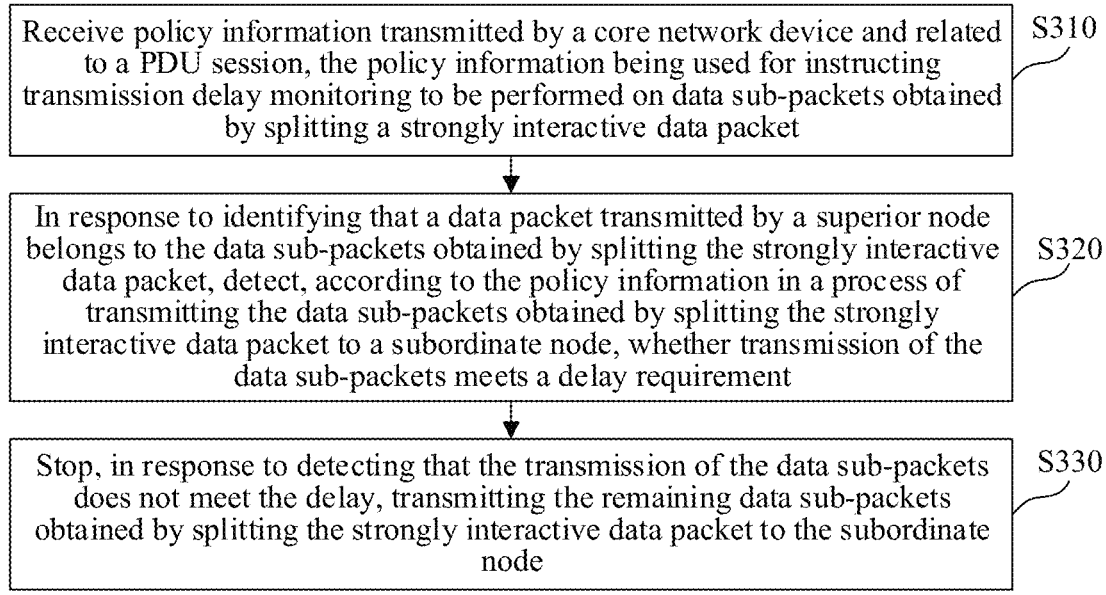
FIG. 3 shows a flowchart of a data transmission method according to one embodiment of this disclosure.

FIG. 3 shows a flowchart of a data transmission method according to one embodiment of this disclosure. The data transmission method may be implemented by a UPF or a gNB. Referring to FIG. 3, the data transmission method at least includes steps S310 to S330, which are described in detail as follows.

In step S310, policy information transmitted by a core network device and related to a PDU session is received, the policy information being used for instructing transmission delay monitoring to be performed on data sub-packets obtained by splitting a strongly interactive data packet. For example, policy information transmitted by a core network device and related to a Protocol Data Unit (PDU) session is received, the policy information instructing transmission delay monitoring to be performed on data sub-packets obtained by splitting a data packet of an interactive service.

In one embodiment of this disclosure, if an executive of this embodiment shown in FIG. 3 is a UPF, a superior node in the following is an application server, that is, the UPF receives a data packet transmitted by the application server and then transmits the data packet to a gNB of a subordinate node. In this case, the policy information received by the UPF and related to the PDU session is PDU session management policy information transmitted by an SMF.

In one embodiment of this disclosure, if an executive of this embodiment shown in FIG. 3 is a gNB, a superior node in the following is a UPF, that is, the gNB receives a data packet transmitted by the UPF and then transmits the data packet to a UE of a subordinate node. In this case, the policy information received by the gNB and related to the PDU session is access stratum context information transmitted by an AMF.

If a gNB is separated into a control plane and the user plane are separated, namely if the gNB is separated into a gNB-Centralized Unit (CU) and a gNB-Distributed Unit (DU), the gNB-CU is used as the control plane, and gNB-CU is used as the user plane. The gNB in this embodiment of this disclosure may be the gNB-DU.

In step S320, in response to identifying that a data packet transmitted by a superior node belongs to the data sub-packets obtained by splitting the strongly interactive data packet, whether transmission of the data sub-packets meets a delay requirement is detected detecting according to the policy information in a process of transmitting the data sub-packets obtained by splitting the strongly interactive data packet to a subordinate node. For example, in response to identifying that a data packet transmitted by a previous node is one of the data sub-packets obtained by splitting the data packet of the interactive service, it is detected whether transmission of the data sub-packets meets a delay requirement, according to the policy information in a process of transmitting the data sub-packets to a subsequent node.

In one embodiment of this disclosure, the plurality of data sub-packets obtained by splitting the strongly interactive data packet includes a start data packet and an end data packet. The start data packet contains first indication information, the first indication information being used for indicating that the start data packet is a first transmitted data sub-packet of the plurality of data sub-packets; and the end data packet contains second indication information, the second indication information being used for indicating that the end data packet is a last transmitted data sub-packet of the plurality of data sub-packets. According to the technical solution of this embodiment, whether the data sub-packets obtained by splitting the strongly interactive data packet are received may be determined by identifying the start data packet and the end data packet. For example, if the start data packet is identified according to the first indication information contained in the start data packet, the data packets from the start data packet to the end data packet belong to the data sub-packets obtained by splitting the strongly interactive data packet.

In one embodiment of this disclosure, whether the received data packet belongs to the data sub-packets obtained by splitting the strongly interactive data packet may be identified according to the indication information contained in a protocol field of a received data packet. Specifically, for example, if indication information used for indicating the start data packet is added in the protocol field of the start data packet in the data sub-packets obtained by splitting the strongly interactive data packet, and indication information used for indicating the end data packet is added in the protocol field of the end data packet, after the start data packet is identified according to the protocol field of the data packet, the data packets from the start data packet to the end data packet all belong to the data sub-packets obtained by splitting the strongly interactive data packet.

In one embodiment of this disclosure, whether the received data packet belongs to the data sub-packets obtained by splitting the strongly interactive data packet may be identified according to indication information contained in payload information of a received data packet. Specifically, for example, if indication information used for indicating the start data packet is added in the payload information of the start data packet in the data sub-packets obtained by splitting the strongly interactive data packet, and indication information used for indicating the end data packet is added in the payload information of the end data packet, after the start data packet is identified according to the payload information of the data packet, the data packets from the start data packet to the end data packet all belong to the data sub-packets obtained by splitting the strongly interactive data packet.

In step S330, transmitting the remaining data sub-packets obtained by splitting the strongly interactive data packet to the subordinate node is stopped in response to detecting that the transmission of the data sub-packets does not meet the delay requirement. For example, in response to detecting that the transmission of the data sub-packets does not meet the delay requirement, transmitting remaining data sub-packets obtained by splitting the data packet of the interactive service to the subsequent node is stopped.

In this embodiment of this disclosure, since the strongly interactive data packet has a delay requirement, it is meaningless to continue to transmit the remaining data sub-packets if it is detected that the transmission of the data sub-packets obtained by splitting the strongly interactive data packet does not meet the delay requirement. Therefore, transmitting the remaining data sub-packets obtained by splitting the strongly interactive data packet to the subordinate node may be stopped, so as to reduce the occupancy of a bandwidth, which is favorable for reducing the occupancy of transmission resources during the transmission of the strongly interactive data packet.

In one embodiment of this disclosure, the fact that the transmission of the data sub-packets does not meet the delay requirement may be that a time delay of the transmission of the data sub-packets exceeds a set time delay threshold. One time delay threshold may be set for each of the data sub-packets. The time delay thresholds of all the data sub-packets may be the same. If the time delay of transmission of a certain data sub-packet exceeds the time delay threshold, it indicates that the transmission of the data sub-packet does not meet the delay requirement. If the time delay of the transmission of the data sub-packet does not exceed the time delay threshold, it indicates that the transmission of the data sub-packet meets the delay requirement. Or, one time delay threshold may be set for the entire strongly interactive data packet. In the process of splitting the strongly interactive data packet to obtain the various data sub-packets, if it is detected that the overall transmission time delay of the data sub-packets obtained by splitting the strongly interactive data packet exceeds the time delay threshold, it indicates that the transmission of the data sub-packets does not meet the delay requirement. If it is detected that the overall transmission time delay of the data sub-packets obtained by splitting the strongly interactive data packet does not exceed the time delay threshold, it indicates that the transmission of the data sub-packets meets the delay requirement.

In one embodiment of this disclosure, if it is determined that the transmission of the data sub-packet meets the delay requirement during transmission of a certain data sub-packet, after the data sub-packet is successfully transmitted, a next data sub-packet is continued to be transmitted until all the data sub-packets obtained by splitting the strongly interactive data packet are completely transmitted.

In one embodiment of this embodiment, if it is detected that the transmission of the data sub-packets does not meet the delay requirement, the received data sub-packets obtained by splitting the strongly interactive data packet may also be abandoned to reduce the occupancy of storage resources.

In one embodiment of this disclosure, if it is detected that the transmission of the data sub-packets does not meet the delay requirement, feedback information may be transmitted to the superior node. The feedback information is used for instructing the superior node to stop transmitting the data sub-packets obtained by splitting the strongly interactive data packet. According to the technical solution of this embodiment, when it is detected that the data sub-packets transmitted to the subordinate node do not meet the delay requirement, the feedback information may be transmitted to the superior node, so as to instruct the superior node to stop transmitting the remaining data sub-packets to avoid the occupancy of transmission resources.

In one embodiment, transmitting the feedback information to the superior node is carried out in a case that all the data sub-packets obtained by splitting the strongly interactive data packet are not completely received. It is not necessary to transmit the feedback information to the superior node if all the data sub-packets obtained by splitting the strongly interactive data packet have been completely received.

In one embodiment of this disclosure, in a case that all the data sub-packets transmitted by the superior node and obtained by splitting the strongly interactive data packet are not completely received within a set duration, transmitting the data sub-packets obtained by splitting the strongly interactive data packet to the subordinate node is stopped, and the received data sub-packets obtained by splitting the strongly interactive data packet are abandoned. In the technical solution of this embodiment, the strongly interactive data packet is a data packet with a time limit requirement. If all the data sub-packets transmitted by the superior node and obtained by splitting the strongly interactive data packet are not completely received within the set duration, it indicates that the strongly interactive data packet has exceeded the time limit requirement; and at this time, it is not necessary to transmit the data sub-packets to the subordinate node. Of course, if all the data sub-packets transmitted by the superior node and obtained by splitting the strongly interactive data packet are not completely received within the set duration, it may possibly be because the superior node stops transmitting the data sub-packets after detecting an error in the transmission of the data sub-packets or detecting that the transmission of the data sub-packets does not meet the delay requirement. At this time, it also indicates that it is not necessary to transmit the data sub-packets to the subordinate node. In this case, the transmission to the subordinate node may also be stopped, and the received data sub-packets may be abandoned.

In FIG. 3, the data transmission method of this embodiment of this disclosure is illustrated in perspective of the UPF or the gNB. The data transmission method of this embodiment of this disclosure is illustrated in perspective of a UE.

Figure 4:
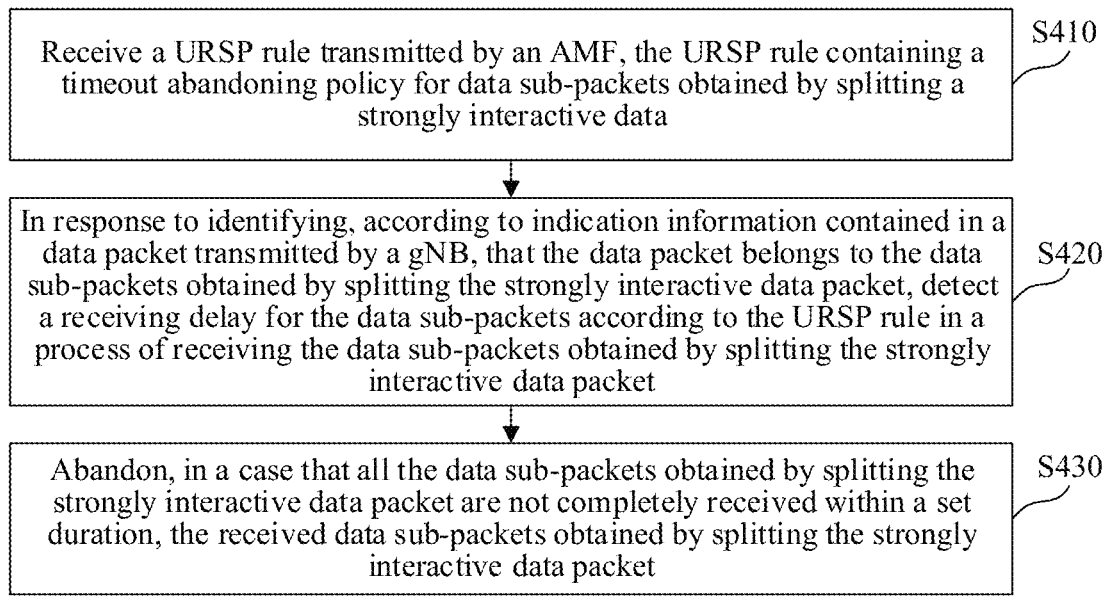
FIG. 4 shows a flowchart of a data transmission method according to one embodiment of this disclosure.

FIG. 4 shows a flowchart of a data transmission method according to one embodiment of this disclosure. The data transmission method may be implemented by a UE. Referring to FIG. 4, the data transmission method at least includes steps S410 to S430, which are described in detail as follows.

In step S410, a URSP rule transmitted by an AMF is received, the URSP rule containing a timeout abandoning policy for data sub-packets obtained by splitting a strongly interactive data packet. For example, a URSP rule transmitted by an AMF is received, the URSP rule containing a timeout abandoning policy for data sub-packets obtained by splitting a data packet of an interactive service.

In step S420, in response to identifying, according to indication information contained in a data packet transmitted by a gNB, that the data packet belongs to the data sub-packets obtained by splitting the strongly interactive data packet, a receiving delay for the data sub-packets is detected according to the URSP rule in a process of receiving the data sub-packets obtained by splitting the strongly interactive data packet. For example, in response to identifying, according to indication information contained in a data packet transmitted by a next generation nodeB, that the data packet is one of the data sub-packets obtained by splitting the data packet of the interactive service, a receiving delay is detected for the data sub-packets according to the URSP rule in a process of receiving the data sub-packets obtained by splitting the data packet of the interactive service.

In one embodiment of this disclosure, the plurality of data sub-packets obtained by splitting the strongly interactive data packet includes a start data packet and an end data packet.

In one embodiment of this disclosure, whether the received data packet belongs to the data sub-packets obtained by splitting the strongly interactive data packet may be identified according to the indication information contained in a protocol field of a received data packet.

In one embodiment of this disclosure, whether the received data packet belongs to the data sub-packets obtained by splitting the strongly interactive data packet may be identified according to indication information contained in payload information of a received data packet.

In step S430, the received data sub-packets obtained by splitting the strongly interactive data packet are abandoned in a case that all the data sub-packets obtained by splitting the strongly interactive data packet are not completely received within a set duration. For example, in response to a determination that all data sub-packets obtained by splitting the data packet of the interactive service are not completely received within a set duration, previously received data sub-packets obtained by splitting the data packet of the interactive service are discarded.

In the technical solution of this embodiment, the strongly interactive data packet is a data packet with a time limit requirement. If all the data sub-packets obtained by splitting the strongly interactive data packet are not completely received within the set duration, it indicates that the strongly interactive data packet has exceeded the time limit requirement; and at this time, it is not necessary to receive the data sub-packets for integration. Therefore, the received data sub-packets may be abandoned. Of course, if all the data sub-packets obtained by splitting the strongly interactive data packet are not completely received within the set duration, it may possibly be because the gNB stops transmitting the data sub-packets after detecting an error in the transmission of the data sub-packets or detecting that the transmission of the data sub-packets does not meet the delay requirement. At this time, the received data sub-packets may also be abandoned.

In one embodiment of this disclosure, if the UE completely receives, within the set duration, all the data sub-packets obtained by splitting the strongly interactive data packet, the UE may integrate all the data sub-packets obtained by splitting the strongly interactive data packet to obtain the strongly interactive data packet. When all the data sub-packets obtained by splitting the strongly interactive data packet are integrated, the data sub-packets may be integrated in sequence according to an order of these data sub-packets, thus finally obtaining the whole strongly interactive data packet.

In one embodiment of this disclosure, feedback information is transmitted, in a case that all the data sub-packets obtained by splitting the strongly interactive data packet are not completely received within the set duration, to the application server that transmits the strongly interactive data packet, so as to indicate that the transmission of the strongly interactive data packet fails. According to the technical solution of this embodiment, when the UE does not completely receive, within the set duration, all the data sub-packets obtained by splitting the strongly interactive data packet, the UE may transmit the feedback information to the application server, so as to indicate the application server that the transmission of the strongly interactive data packet fails, and the application server determines whether to perform retransmission.

The data transmission method of this embodiment of this disclosure may be described in perspective of a Policy Control Function (PCF).

Figure 5:
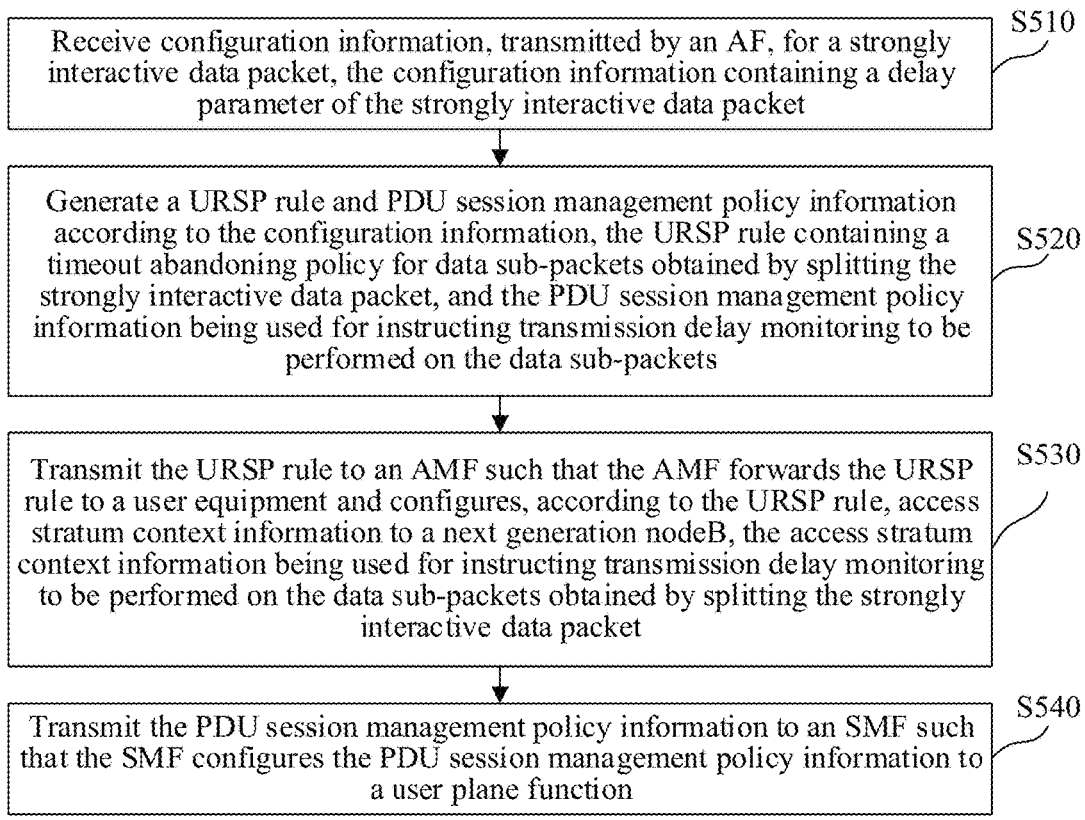
FIG. 5 shows a flowchart of a data transmission method according to one embodiment of this disclosure.

FIG. 5 shows a flowchart of a data transmission method according to one embodiment of this disclosure. The data transmission method may be implemented by a PCF.

Referring to FIG. 5, the data transmission method at least includes steps S510 to S540, which are described in detail as follows.

In step S510, configuration information, transmitted by an AF, for a strongly interactive data packet, is received, the configuration information containing a delay parameter of the strongly interactive data packet. For example, configuration information, transmitted by an Application Function (AF), is received for a data packet of an interactive service, the configuration information containing a delay parameter of the data packet of the interactive service.

In one embodiment of this disclosure, the AF may directly transmit the configuration information for the strongly interactive data packet to the PCF, or the AF may transmit the configuration information for the strongly interactive data packet to the PCF through a Network Exposure Function (NEF). The delay parameter included in the configuration information can be the maximum delay information that the strongly interactive data packet can accept. If the transmission delay of the strong-interaction data packet exceeds the maximum delay information, the strong-interaction data packet becomes invalid. the data package.

In step S520, a URSP rule and PDU session management policy information are generated according to the configuration information, the URSP rule containing a timeout abandoning policy for data sub-packets obtained by splitting the strongly interactive data packet, and the PDU session management policy information being used for instructing transmission delay monitoring to be performed on the data sub-packets. For example, a URSP rule and PDU session management policy information are generated according to the configuration information, the URSP rule containing a timeout abandoning policy for data sub-packets obtained by splitting the data packet of the interactive service, and the PDU session management policy information instructing transmission delay monitoring to be performed on the data sub-packets.

In step S530, the URSP rule is transmitted to an AMF such that the AMF forwards the URSP rule to a UE and configures, according to the URSP rule, access stratum context information to a gNB, the access stratum context information being used for instructing transmission delay monitoring to be performed on the data sub-packets obtained by splitting the strongly interactive data packet. For example, the URSP rule is transmitted to an Access and Mobility Management Function (AMF) such that the AMF forwards the URSP rule to a user equipment and configures, according to the URSP rule, access stratum context information to a next generation nodeB, the access stratum context information instructing transmission delay monitoring to be performed on the data sub-packets obtained by splitting the data packet of the interactive service.

In one embodiment of this disclosure, the AMF may directly forward the URSP rules to the UE, and the AMF may generate, according to the URSP rule, the access stratum context information configured to the gNB, and then transmit the access stratum context information to the gNB.

In step S540, the PDU session management policy information is transmitted to an SMF such that the SMF configures the PDU session management policy information to a UPF. For example, the PDU session management policy information is transmitted to a Session Management Function (SMF) such that the SMF configures the PDU session management policy information to a user plane function.

In one embodiment of this disclosure, the SMF may directly forward the PDU session management policy information to the UPF.

The above embodiments describe the technical solutions of the embodiments of this disclosure in perspective of the UPF, the gNB, the UE and the PCF. The technical solutions of the embodiments of this disclosure are further explained in perspective of interactions between the various entities.

Figure 6:
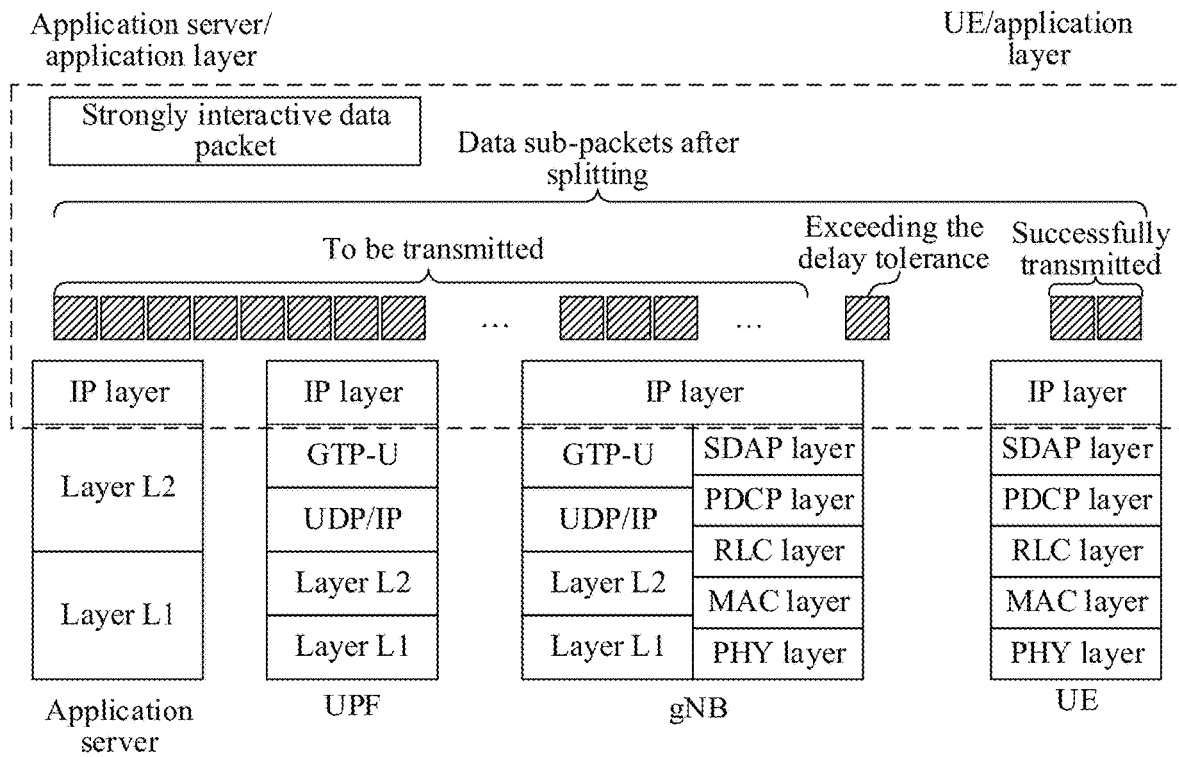
FIG. 6 shows a schematic diagram of a transmission process of a strongly interactive data packet according to one embodiment of this disclosure.

In one embodiment of this disclosure, after a strongly interactive data packet is split, data sub-packets obtained by splitting the strongly interactive data packet may be marked with start and end. As shown in FIG. 6, based on a marked start data sub-packet and end data sub-packet, if some of N data sub-packets split from one strongly interactive data packet have exceeded a delay tolerance during transmission, the subsequent data sub-packets do not need to be transmitted and may be abandoned.

Figure 7:
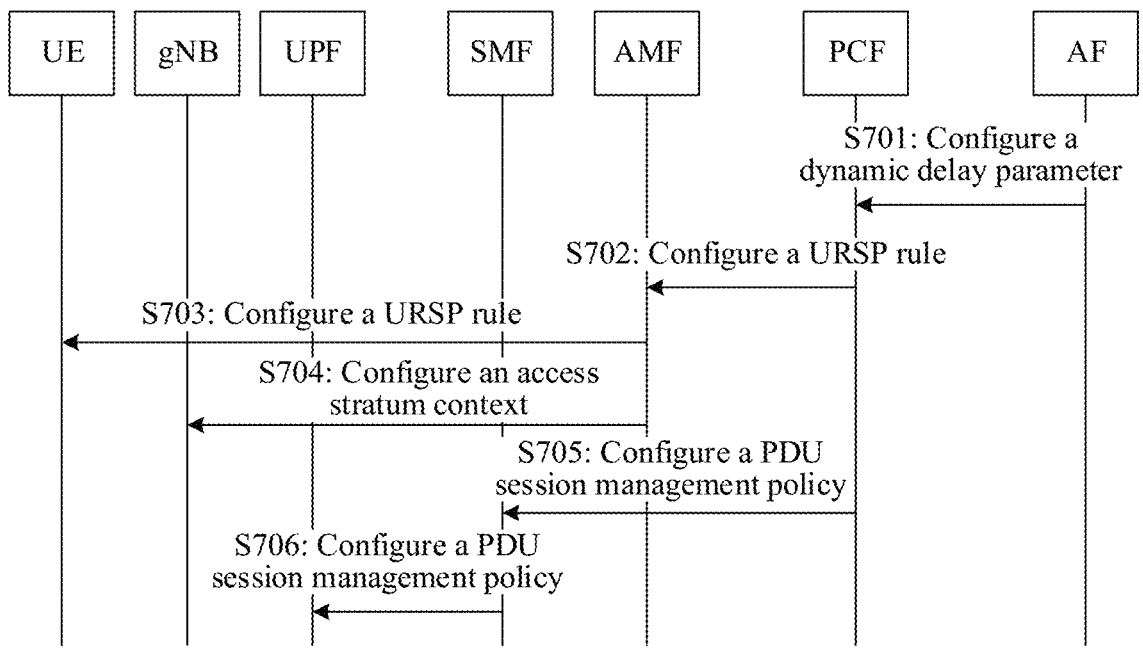
FIG. 7 shows a flowchart of configuration of a control panel according to one embodiment of this disclosure.

In one embodiment of this disclosure, before the management of the transmission process of the data sub-packets, a configuration process of a control plane needs to be performed, so that the UE and each network element can acquire parameters of delay monitoring and processing of the strongly interactive data packet. The specific process is shown in FIG. 7, including the following steps:

Step S701, the AF configures a dynamic delay parameter to the PCF.

In one embodiment of this disclosure, the AF may configure the dynamic delay parameter by configuring a PDU session policy of the strongly interactive data packet to the PCF.

Specifically, the AF may directly transmit the PDU session policy of the strongly interactive data packet to the PCF, or the AF may also transmit the PDU session policy of the strongly interactive data packet to the PCF through the NEF.

Step S702, the PCF configures a URSP rule to the AMF.

In one embodiment of this disclosure, the URSP rule configured by the PCF to the AMF is related to a PDU session, and includes a timeout abandoning policy for the strongly interactive data packet, that is, if the data sub-packets obtained by splitting the strongly interactive data packet have a transmission timeout, the received data sub-packets are abandoned.

Step S703, the AMF configures a URSP rule to the UE.

In one embodiment of this disclosure, the URSP rule configured by the AMF to the UE includes a timeout abandoning policy for the strongly interactive data packet, that is, if the data sub-packets obtained by splitting the strongly interactive data packet have a transmission timeout, the received data sub-packets are abandoned.

Step S704, the AMF configures an access stratum context to the gNB.

In one embodiment of this disclosure, the Access Stratum (AS) context configured by the AMF to the gNB is related to a PDU session, and includes a policy for segmented monitoring of a delay of the strongly interactive data packet (that is, monitoring each of the data sub-packets).

Step S705, the PCF configures a PDU session management policy to the SMF.

In one embodiment of this disclosure, the PDU session management policy includes a policy for segmented monitoring of the delay of the strongly interactive data packet.

Step S706, the SMF configures a PDU session management policy to the UPF.

Figure 8:
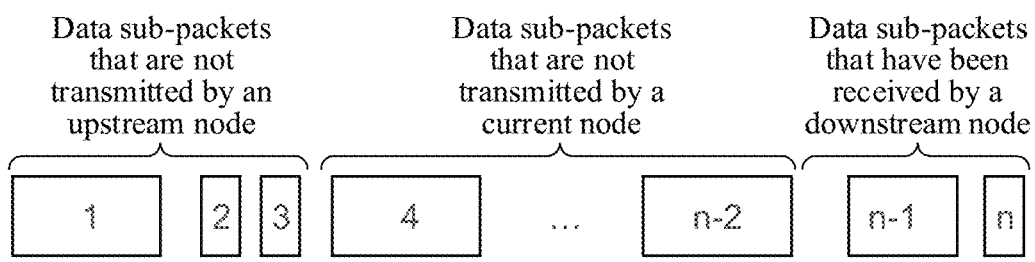
FIG. 8 shows a schematic diagram of a transmission process of a data sub-packet according to one embodiment of this disclosure.

After the configuration of the control plane is completed, the segmented transmission of the strongly interactive data packet (that is, the strongly interactive data packet is split into data sub-packets for transmission) needs to follow the following principles: If it has been determined that some IP sub-packets formed by splitting a huge IP packet (i.e. the strongly interactive data packet) exceed a time limit requirement for transmission, the successfully transmitted data packets need to be abandoned even if they have been received by a receiver; and if there are still some IP sub-packets that have not been transmitted, a transmitter also needs to abandon them to start transmission of a next strongly interactive data packet as soon as possible. Specifically, as shown in FIG. 8, a current node being the UPF or gNB is taken as an example. The current node may transmit, to a downstream node, some data sub-packets transmitted by an upstream node after receiving them. In this case, the upstream node, the current node and the downstream node all store some data sub-packets. If the current node detects that the transmission of the data sub-packets does not meet the delay requirement, the remaining untransmitted data sub-packets of the current node are abandoned, and the untransmitted sub-packets of the upstream node are also abandoned. The data sub-packets that have been received by the downstream node may be cleaned on the basis of a timeout abandoning mechanism when other data sub-packets are not transmitted.

If the application server or the UE retransmits a strongly interactive data packet at an application layer, the retransmitted data packet may be marked as a new strongly interactive data packet for transmission. The specific transmission manner is the same as that defined in this embodiment of this disclosure.

Figure 9:
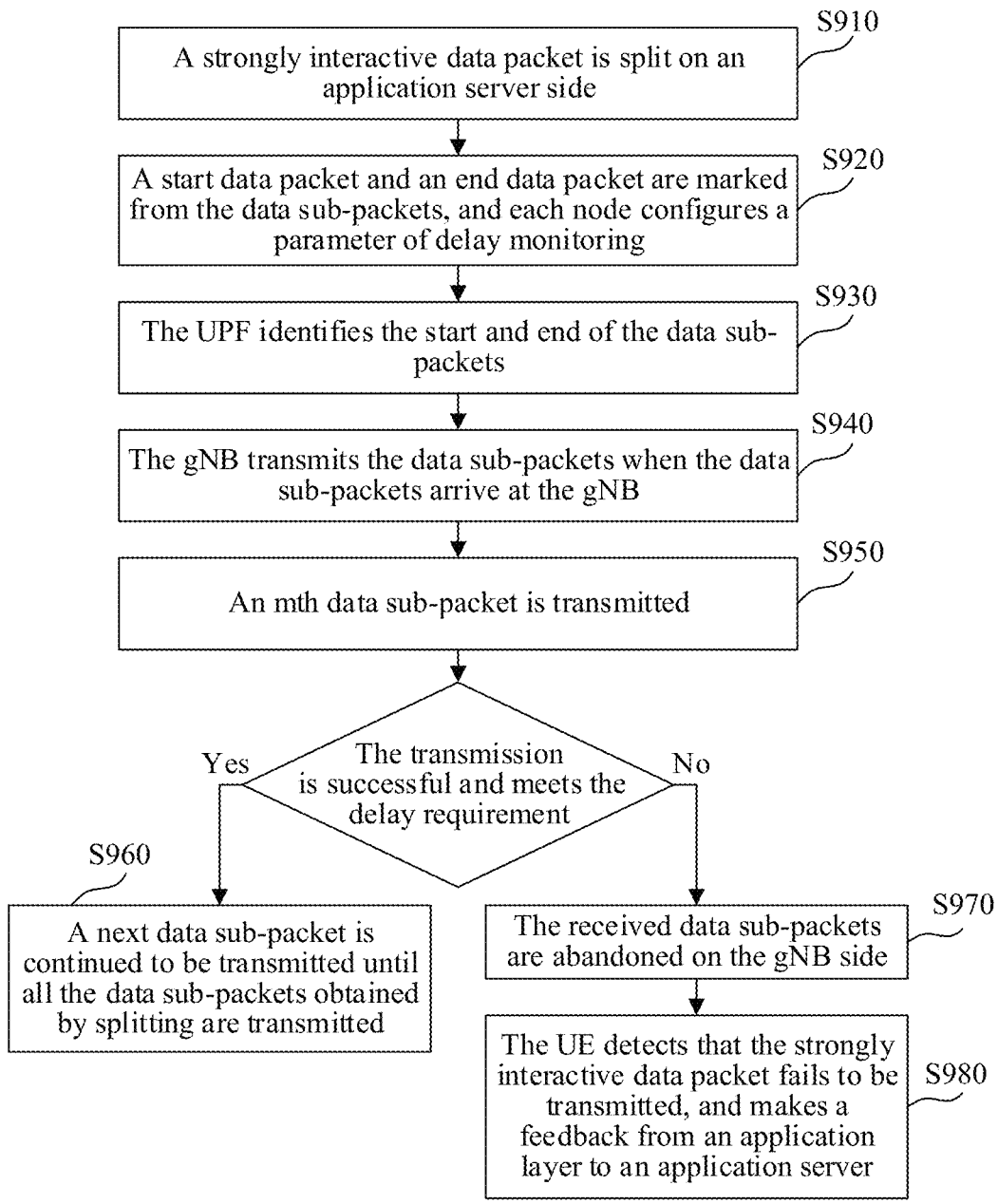
FIG. 9 shows a schematic diagram of a transmission process of a strongly interactive data packet according to one embodiment of this disclosure.

In one embodiment of this disclosure, as shown in FIG. 9, the data transmission method according to one embodiment of this disclosure may include the following steps:

Step S910, a strongly interactive data packet is split on an application server side.

In one embodiment of this disclosure, the application server may determine a sub-packet size according to information such as a set data sub-packet size or a state of a network, and then split the strongly interactive data packet according to the sub-packet size to obtain a plurality of data sub-packets.

Step S920, a start data packet and an end data packet are marked from the data sub-packets, and each node configures parameters of delay monitoring.

In one embodiment of this disclosure, indication information may be added to the start data packet and the end data packet to mark out which data sub-packet is the start data packet and which data sub-packet is the end data packet. The indication information may be added in a protocol field or payload information of a data packet. For example, the indication information is added in a field of a GTP-U. For parameters of delay monitoring configured by each node, reference may be made to the technical solutions in the foregoing embodiments.

Step S930, the UPF identifies the start and end of the data sub-packets.

In one embodiment of this disclosure, when the application server transmits the data sub-packets obtained by splitting to the UPF, the UPF may identify the start data packet and the end data packet.

Step S940, the gNB transmits the data sub-packets when the data sub-packets arrive at the gNB.

In one embodiment of this disclosure, after receiving the data sub-packets transmitted by the application server, the UPF transmits the data sub-packets to the gNB, and then the gNB transmits the data sub-packets to the UE. The gNB needs to be enhanced to be able to identify the indication information in the data sub-packets, and then determine the start data packet and the end data packet, so as to identify a series of data sub-packets obtained by splitting the strongly interactive data packet.

Step S950, an mth data sub-packet is transmitted; if the transmission is successful and meets the delay requirement, step S960 is executed; and if the transmission fails or the transmission does not meet the delay requirement, step S970 is executed.

In one embodiment of this disclosure, the gNB may transmit the data sub-packets to the UE through a Uu interface. At the same time, whether the data transmission succeeds or fails may be determined through a protocol, such as the PDCP and the RLC, of the Uu interface, and the delay tolerance is determined.

Step S960, if the transmission is successful, a next data sub-packet is continued to be transmitted until all the split data sub-packets are transmitted.

Step S970, if the transmission fails or the transmission does not meet the delay requirement, the received data sub-packets are abandoned at the gNB side. At this time, other data sub-packets transmitted by the UPF are no longer transmitted to the UE.

Step S980, the UE detects that the strongly interactive data packet fails to be transmitted, and makes a feedback from an application layer to an application server. If the UE does not completely receive all the data sub-packets of the strongly interactive data packet within a certain time limit, it may determine that the strongly interactive data packet fails to be transmitted. The information fed back to the application server is used for indicating that the strongly interactive data packet has failed to be transmitted.

Figure 10:
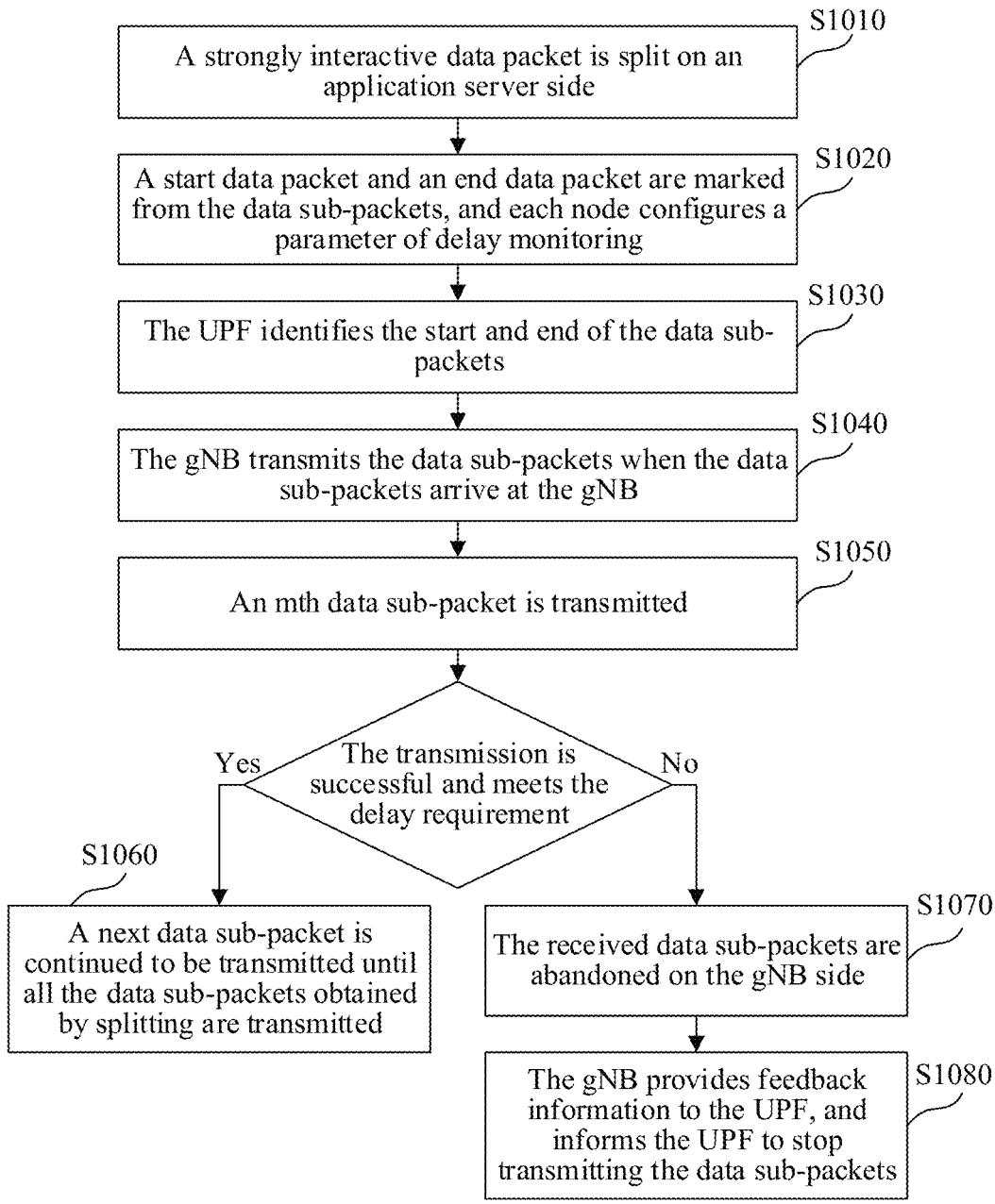
FIG. 10 shows a schematic diagram of a transmission process of a strongly interactive data packet according to one embodiment of this disclosure.

In the technical solution of this embodiment shown in FIG. 9, the gNB is not required to indicate to the UPF the transmission of the strongly interactive data packet, but the UE needs to indicate the failure of the transmission of the strongly interactive data packet from the application layer to the application server. In another embodiment of this disclosure, as shown in FIG. 10, the following steps are included.

Step S1010, a strongly interactive data packet is split on an application server side.

In one embodiment of this disclosure, the application server may determine a sub-packet size according to information such as a set data sub-packet size or a state of a network, and then split the strongly interactive data packet according to the sub-packet size to obtain a plurality of data sub-packets.

Step S1020, a start data packet and an end data packet are marked from the data sub-packets, and each node configures parameters of delay monitoring.

In one embodiment of this disclosure, indication information may be added to the start data packet and the end data packet to mark out which data sub-packet is the start data packet and which data sub-packet is the end data packet. The indication information may be added in a protocol field or payload information of a data packet. For example, the indication information is added in a field of a GTP-U. For parameters of delay monitoring configured by each node, reference may be made to the technical solutions in the foregoing embodiments.

Step S1030, the UPF identifies the start and end of the data sub-packets.

In one embodiment of this disclosure, when the application server transmits the data sub-packets obtained by splitting to the UPF, the UPF may identify the start data packet and the end data packet.

Step S1040, the gNB transmits the data sub-packets when the data sub-packets arrive at the gNB.

In one embodiment of this disclosure, after receiving the data sub-packets transmitted by the application server, the UPF transmits the data sub-packets to the gNB, and then the gNB transmits the data sub-packets to the UE. The gNB needs to be enhanced to be able to identify the indication information in the data sub-packets, and then determine the start data packet and the end data packet, so as to identify a series of data sub-packets obtained by splitting the strongly interactive data packet.

Step S1050, an mth data sub-packet is transmitted; if the transmission is successful and meets the delay requirement, step S1060 is executed; and if the transmission fails or the transmission does not meet the delay requirement, step S1070 is executed.

In one embodiment of this disclosure, the gNB may transmit the data sub-packets to the UE through a Uu interface. At the same time, whether the data transmission succeeds or fails may be determined through a protocol, such as the PDCP and the RLC, of the Uu interface, and the delay tolerance is determined.

Step S1060, if the transmission is successful, a next data sub-packet is continued to be transmitted until all the split data sub-packets are transmitted.

Step S1070, if the transmission fails or the transmission does not meet the delay requirement, the received data sub-packets are abandoned at the gNB side. At this time, other data sub-packets transmitted by the UPF are no longer transmitted to the UE.

S1080, the gNB provides feedback information to the UPF, and informs the UPF to stop transmitting the data sub-packets. If the gNB has completely received all the data sub-packets obtained by splitting the strongly interactive data packet, no more feedback information will be provided for the UPF.

In one embodiment of this disclosure, the technical solutions of the embodiments shown in FIG. 9 and FIG. 10 may also be combined. That is, the UE makes the feedback from the application layer to the application server when detecting that the strongly interactive data packet fails to be transmitted; and after determining that the transmission fails, the gNB may also provide the feedback information for the UPF to inform the UPF to stop transmitting the data sub-packets.

Figure 11:
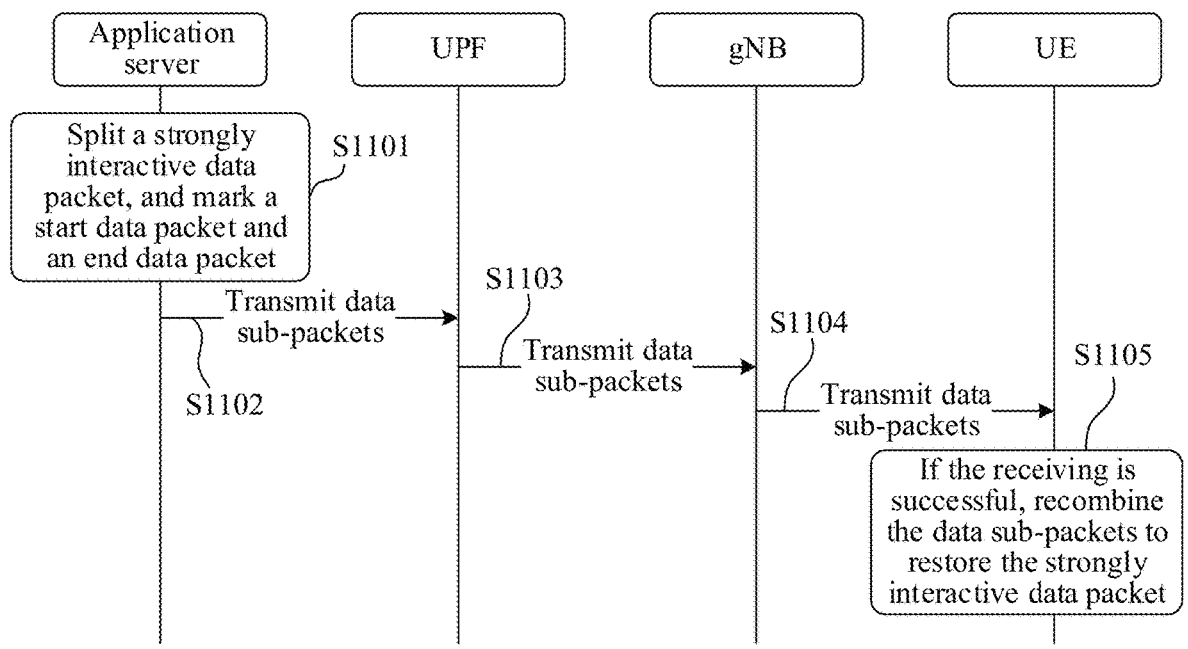
FIG. 11 shows a schematic diagram of a transmission process of a strongly interactive data packet according to one embodiment of this disclosure.

In one embodiment of this disclosure, after each node configures the parameter of delay monitoring, an interaction process among the application server, the UPF, the gNB and the UE is as shown in FIG. 11, specifically including the following steps:

S1101, the application server splits a strongly interactive data packet to obtain data sub-packets, and marks a start data packet and an end data packet.

In one embodiment of this disclosure, indication information may be added to the start data packet and the end data packet to mark out which data sub-packet is the start data packet and which data sub-packet is the end data packet. The indication information may be added in a protocol field or payload information of a data packet. For example, the indication information is added in a field of a GTP-U.

S1102, the application server transmits the data sub-packets to the UPF.

In one embodiment of this disclosure, when the application server transmits the data sub-packets obtained by splitting to the UPF, the UPF may identify the start data packet and the end data packet.

S1103, the UPF transmits the data sub-packets to the gNB.

In one embodiment of this disclosure, the process of transmitting the data sub-packets by the UPF to the gNB and the process of transmitting the data sub-packets by the application server to the UPF are synchronously carried out. For example, after receiving the data sub-packets transmitted by the application server, but not completely transmitting the data sub-packets, the UPF may transmit the data sub-packets to the gNB. This manner can reduce the delay of arrival of the data sub-packets at the UE. Of course, the UPF may also transmit the data sub-packets to the gNB after receiving all the data sub-packets transmitted by the application server. This manner avoids the following problem: transmission resources are wasted by invalidity of the data sub-packets transmitted first to the gNB because of an error in the receiving process of the UPF.

In one embodiment of this disclosure, in the process of transmitting the data sub-packets obtained by splitting the strongly interactive data packet to the gNB, if the UPF detects that a certain data sub-packet fails to be transmitted or detects that the transmission of the data sub-packet exceeds the delay requirement, the UPF may stop transmitting the remaining data sub-packets to the gNB, so as to avoid the occupancy of the transmission resources caused by continuous transmission. In this case, the UPF may also delete the received data sub-packets, and the UPF may also inform the application server to stop transmitting the data sub-packets to the UPF.

In one embodiment of this disclosure, the UPF may also stop transmitting the data sub-packets to the gNB when not receiving, within a certain duration, all the data sub-packets transmitted by the application server; the UPF may also delete the received data sub-packets; and in addition, the UPF may also inform the application server to stop transmitting the data sub-packets to the UPF.

Step S1104, the gNB transmits the data sub-packets to the UE.

In one embodiment of this disclosure, the process of transmitting the data sub-packets by the gNB to the UE and the process of transmitting the data sub-packets by the UPF to the gNB may be carried out synchronously. For example, the gNB may transmit the data sub-packets to the UE after receiving the data sub-packets, but not all the data sub-packets, transmitted by the UPF. This manner can reduce the delay of the data packets arriving at the UE. Of course, the gNB may also transmit the data sub-packets to the UE after receiving all the data sub-packets transmitted by the UPF. This manner avoids the following problem: transmission resources are wasted by invalidity of the data sub-packets transmitted first to the UE because of an error in the receiving process of the gNB.

In one embodiment of this disclosure, in the process of transmitting the data sub-packets obtained by splitting the strongly interactive data packet to the UE, if the gNB detects that a certain data sub-packet fails to be transmitted or detects that the transmission of the data sub-packet does not meet the delay requirement, the gNB may stop transmitting the remaining data sub-packets to the UE, so as to avoid the occupancy of the transmission resources caused by continuous transmission. In this case, the gNB may also delete the received data sub-packets, and the gNB may also inform the UPF to stop transmitting the data sub-packets to the gNB.

In one embodiment of this disclosure, the gNB may also stop transmitting the data sub-packets to the UE when not receiving, within a certain duration, all the data sub-packets transmitted by the UPF; the gNB may also delete the received data sub-packets; and in addition, the gNB may also inform the UPF to stop transmitting the data sub-packets to the gNB.

Step S1105, if the UE succeeds in receiving all the data sub-packets, the UE recombines the data sub-packets to restore the strongly interactive data packet.

In some embodiments of this disclosure, if the UE detects that the strongly interactive data packet fails to be transmitted, the UE may make a feedback from the application layer to the application server. If the UE does not completely receive all the data sub-packets of the strongly interactive data packet within a certain time limit, it may determine that the strongly interactive data packet fails to be transmitted. The information fed back to the application server is used for indicating that the strongly interactive data packet has failed to be transmitted.

In the technical solutions of the above-mentioned embodiments of this disclosure, when the data sub-packets obtained by splitting the strongly interactive data packet fail to be transmitted or the transmission exceeds the delay requirement, the occupancy of a bandwidth caused by continuous transmission of the remaining data sub-packets to a subordinate node can be avoided, which is conductive to reducing the occupancy of the transmission resources during the transmission of the strongly interactive data packet.

Although the steps in the flowcharts of the embodiments are displayed sequentially according to instructions of arrows, these steps are not necessarily performed sequentially according to a sequence instructed by the arrows. Unless otherwise explicitly specified in this specification, execution of the steps is not strictly limited, and the steps may be performed in other sequences. In addition, at least some steps in the flowcharts in the foregoing embodiments may include a plurality of steps or a plurality of stages. The steps or the stages are not necessarily performed at the same moment, but may be performed at different moments. The steps or the stages are not necessarily performed in sequence, but may be performed in turn or alternately with another step or at least some of steps or stages of the another step.

The following describes apparatus embodiments of this disclosure, which can be used to implement the data transmission method in the foregoing embodiments of this disclosure. For details undisclosed in the apparatus embodiments of this disclosure, refer to the embodiments of the foregoing data transmission method in this disclosure.

Figure 12:
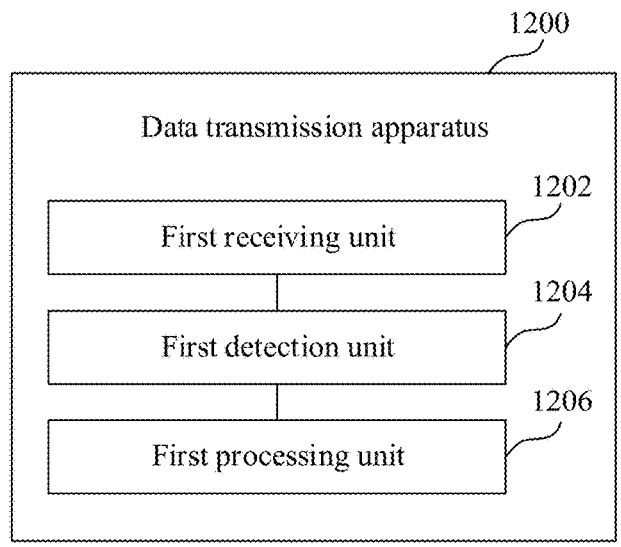
FIG. 12 shows a block diagram of a data transmission apparatus according to one embodiment of this disclosure.

FIG. 12 shows a block diagram of a data transmission apparatus according to one embodiment of this disclosure. The data transmission apparatus may be arranged inside a UPF or a gNB.

Referring to FIG. 12, a data transmission apparatus 1200 according to one embodiment of this disclosure includes a first receiving unit 1202, a first detection unit 1204 and a first processing unit 1206.

The first receiving unit 1202 is configured to receive policy information transmitted by a core network device and related to a PDU session, the policy information being used for instructing transmission delay monitoring to be performed on data sub-packets obtained by splitting a strongly interactive data packet; the first detection unit 1204 is configured to: in response to identifying that a data packet transmitted by a superior node belongs to the data sub-packets obtained by splitting the strongly interactive data packet, detect, according to the policy information in a process of transmitting the data sub-packets obtained by splitting the strongly interactive data packet to a subordinate node, whether transmission of the data sub-packets meets a delay requirement; and the first processing unit 1206 is configured to stop, in response to detecting that the transmission of the data sub-packets does not meet the delay requirement, transmitting the remaining data sub-packets obtained by splitting the strongly interactive data packet to the subordinate node.

In some embodiments of this disclosure, based on the foregoing solution, the first processing unit 1206 is further configured to abandon, in response to detecting that the transmission of the data sub-packets does not meet the delay requirement, the received data sub-packet obtained by splitting the strongly interactive data packet.

In some embodiments of this disclosure, based on the foregoing solution, the first processing unit 1206 is further configured to transmit feedback information to the superior node in response to detecting that the transmission of the data sub-packets does not meet the delay requirement, the feedback information being used for instructing the superior node to stop transmitting the data sub-packets obtained by splitting the strongly interactive data packet.

In some embodiments of this disclosure, based on the foregoing solution, the first processing unit 1206 is further configured to transmit the feedback information to the superior node in a case that all the data sub-packets obtained by splitting the strongly interactive data packets are not completely received.

In some embodiments of this disclosure, based on the foregoing solution, the plurality of data sub-packets obtained by splitting the strongly interactive data packet include a start data packet and an end data packet; the start data packet contains first indication information, the first indication information being used for indicating that the start data packet is a first transmitted data sub-packet of the plurality of data sub-packets; and the end data packet contains second indication information, the second indication information being used for indicating that the end data packet is a last transmitted data sub-packet of the plurality of data sub-packets.

In some embodiments of this disclosure, based on the foregoing solution, the first detection unit 1204 is further configured to identify, according to the indication information contained in a protocol field of a received data packet, whether the received data packet belongs to the data sub-packets obtained by splitting the strongly interactive data packet.

In some embodiments of this disclosure, based on the foregoing solution, the first detection unit 1204 is further configured to identify, according to indication information contained in payload information of a received data packet, whether the received data packet belongs to the data sub-packets obtained by splitting the strongly interactive data packet.

In some embodiments of this disclosure, based on the foregoing solution, the first processing unit 1206 is further configured to stop, in a case that all the data sub-packets transmitted by the superior node and obtained by splitting the strongly interactive data packet are not completely received within a set duration, transmitting the data sub-packets obtained by splitting the strongly interactive data packet to the subordinate node, and abandon the received data sub-packets obtained by splitting the strongly interactive data packet.

In some embodiments of this disclosure, based on the foregoing solution, the data transmission apparatus 1200 is arranged in a UPF; the superior node includes an application server, and the subordinate node includes a gNB. The first receiving unit 1202 is configured to receive PDU session management policy information transmitted by an SMF.

In some embodiments of this disclosure, based on the foregoing solution, the data transmission apparatus 1200 is arranged in a gNB; the superior node includes a UPF, and the subordinate node includes a UE. The first receiving unit 1202 is configured to receive AL context information transmitted by an AMF.

Figure 13:
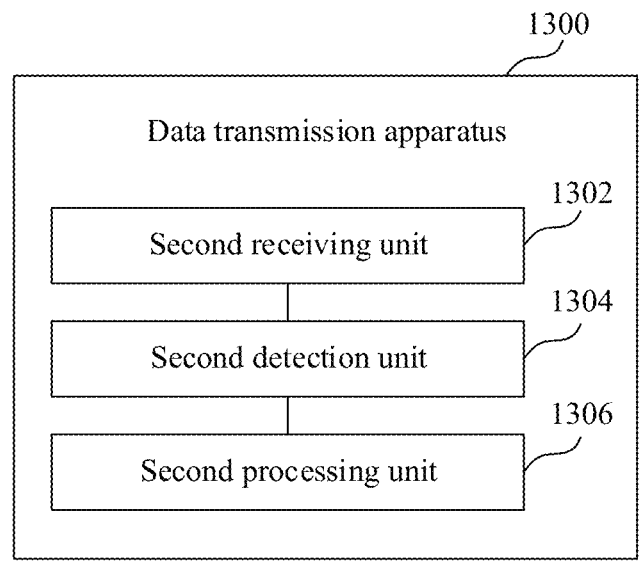
FIG. 13 shows a block diagram of a data transmission apparatus according to one embodiment of this disclosure.

FIG. 13 shows a block diagram of a data transmission apparatus according to one embodiment of this disclosure. The data transmission apparatus may be arranged inside a UE.

Referring to FIG. 13, a data transmission apparatus 1300 according to one embodiment of this disclosure includes a second receiving unit 1302, a second detection unit 1304 and a second processing unit 1306.

The second receiving unit 1302 is configured to receive a URSP rule transmitted by an AMF, the URSP rule containing a timeout abandoning policy for data sub-packets obtained by splitting a strongly interactive data packet; the second detection unit 1304 is configured to: in response to identifying, according to indication information contained in a data packet transmitted by a next generation nodeB, that the data packet belongs to the data sub-packets obtained by splitting the strongly interactive data packet, detect a receiving delay for the data sub-packets according to the URSP rule in a process of receiving the data sub-packets obtained by splitting the strongly interactive data packet; and the second processing unit 1306 is configured to abandon, in a case that all the data sub-packets obtained by splitting the strongly interactive data packet are not completely received within a set duration, the received data sub-packets obtained by splitting the strongly interactive data packet.

In some embodiments of this disclosure, based on the foregoing solution, the second processing unit 1306 is further configured to integrate, in a case that all the data sub-packets obtained by splitting the strongly interactive data packet are completely received within the set duration, all the data sub-packets to obtain the strongly interactive data packet.

In some embodiments of this disclosure, based on the foregoing solution, the second processing unit 1306 is further configured to transmit, in a case that all the data sub-packets obtained by splitting the strongly interactive data packet are not completely received within the set duration, feedback information to the application server that transmits the strongly interactive data packet, so as to indicate that the transmission of the strongly interactive data packet fails.

Figure 14:
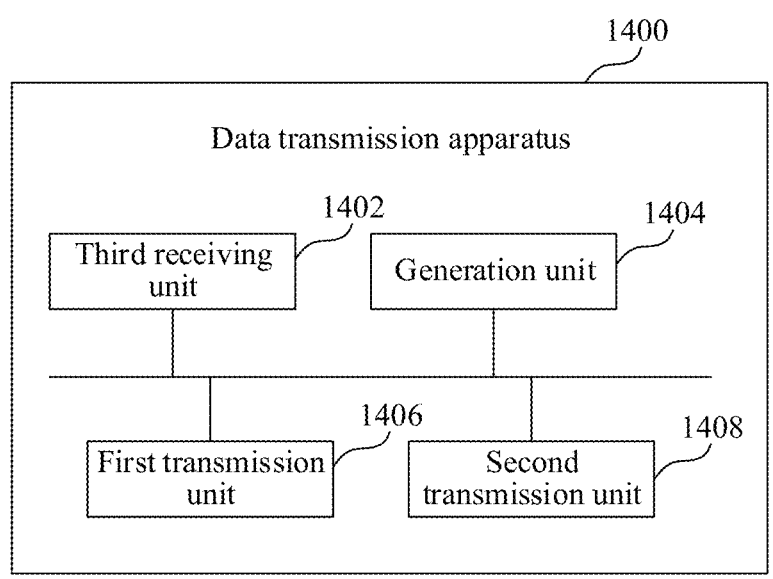
FIG. 14 shows a block diagram of a data transmission apparatus according to one embodiment of this disclosure.

FIG. 14 shows a block diagram of a data transmission apparatus according to one embodiment of this disclosure. The data transmission apparatus may be arranged inside a PCF.

Referring to FIG. 14, a data transmission apparatus 1400 according to an embodiment of this disclosure includes a third receiving unit 1402, a generation unit 1404, a first transmission unit 1406 and a second transmission unit 1408.

The third receiving unit 1402 is configured to receive configuration information, transmitted by an AF, for a strongly interactive data packet, the configuration information containing a delay parameter of the strongly interactive data packet; the generation unit 1404 is configured to generate a URSP rule and PDU session management policy information according to the configuration information, the URSP rule containing a timeout abandoning policy for data sub-packets obtained by splitting the strongly interactive data packet, and the PDU session management policy information being used for instructing transmission delay monitoring to be performed on the data sub-packets; the first transmission unit 1406 is configured to transmit the URSP rule to an AMF such that the AMF forwards the URSP rule to a user equipment and configures, according to the URSP rule, access stratum context information to a next generation nodeB, the access stratum context information being used for instructing transmission delay monitoring to be performed on the data sub-packets obtained by splitting the strongly interactive data packet; and the second transmission unit 1408 is configured to transmit the PDU session management policy information to an SMF such that the SMF configures the PDU session management policy information to a user plane function.

Figure 15:
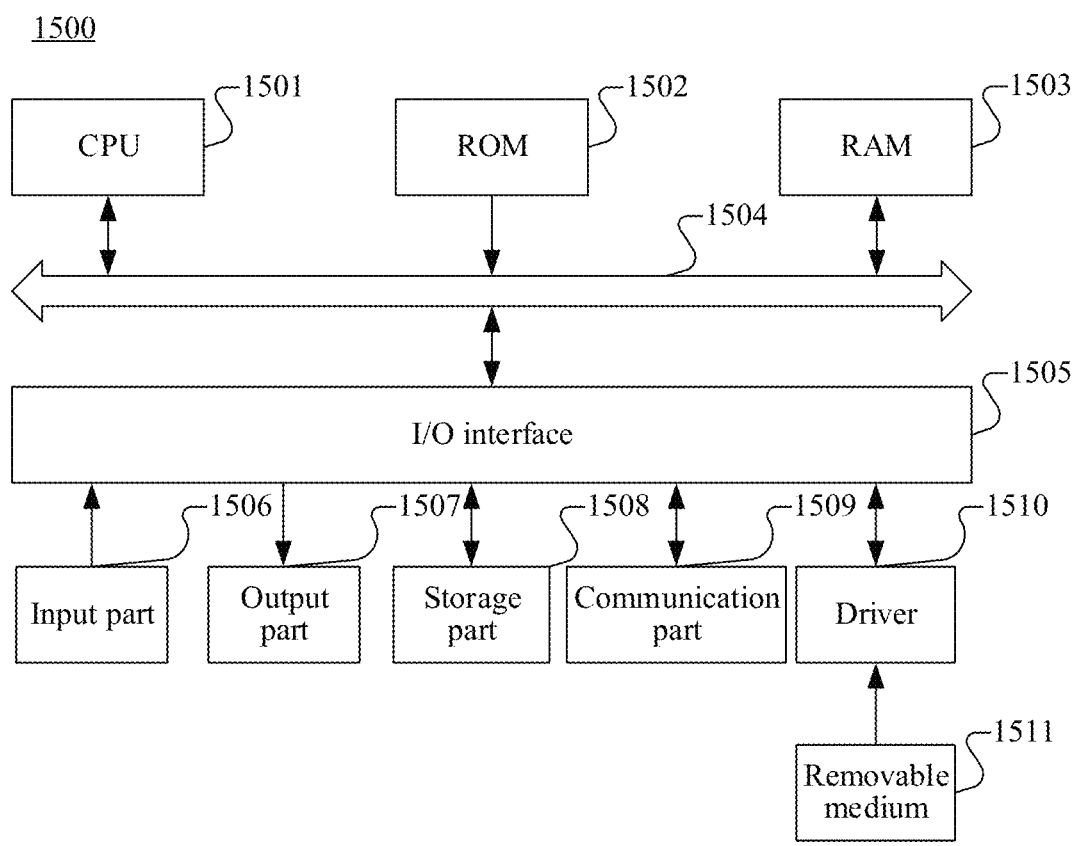
FIG. 15 is a schematic structural diagram of a computer system applicable for implementing an electronic device according to an embodiment of this disclosure.

FIG. 15 is a schematic structural diagram of a computer system adapted to implement an electronic device according to an embodiment of this disclosure.

A computer system 1500 of the electronic device shown in FIG. 15 is merely an example, and does not constitute any limitation on functions and use ranges of the embodiments of this disclosure.

As shown in FIG. 15, the computer system 1500 includes a central processing unit (CPU) 1501, which may perform various suitable actions and processing based on computer-readable instructions stored in a read-only memory (ROM) 1502 or the computer-readable instructions loaded from a storage part 1508 into a random access memory (RAM) 1503, for example, perform the method described in the foregoing embodiments. RAM 1503 further stores various computer-readable instructions and data required for system operations. The CPU 1501, the ROM 1502, and the RAM 1503 are connected to each other through a bus 1504. An input/output (I/O) interface 1505 is also connected to the bus 1504.

The following components are connected to the I/O interface 1505: an input part 1506 including a keyboard, a mouse, or the like, an output part 1507 including a cathode ray tube (CRT), a liquid crystal display (LCD), a speaker, or the like, a storage part 1508 including a hard disk, or the like, and a communication part 1509 including a network interface card such as a local area network (LAN) card or a modem. The communication part 1509 performs communication processing by using a network such as the Internet. A drive 1510 is also connected to the I/O interface 1505 as required. A removable medium 1511, such as a magnetic disk, an optical disc, a magneto-optical disk, or a semiconductor memory, is mounted on the drive 1510 as required, so that computer-readable instructions read from the removable medium is installed into the storage part 1508 as required.

Particularly, according to an embodiment of this disclosure, the processes described in the foregoing by referring to the flowcharts may be implemented as computer software programs. For example, an embodiment of this disclosure includes a computer program product. The computer program product includes a computer program stored in a computer-readable medium. The computer program includes computer-readable instructions used for performing a method shown in the flowchart. In such an embodiment, the computer program may be downloaded and installed from a network through the communication part 1509, and/or installed from the removable medium 1511. When the computer-readable instructions are executed by the CPU 1501, the various functions defined in the system of this disclosure are executed.

In an embodiment, a non-transitory computer-readable storage medium stores computer-readable instructions thereon which, when executed by a computer device, cause the computer device to perform a data transmission method. The data transmission method includes receiving policy information transmitted by a core network device and related to a Protocol Data Unit (PDU) session, the policy information instructing transmission delay monitoring to be performed on data sub-packets obtained by splitting a data packet of an interactive service. The method further includes, in response to identifying that a data packet transmitted by a previous node is one of the data sub-packets obtained by splitting the data packet of the interactive service, detecting, according to the policy information in a process of transmitting the data sub-packets to a subsequent node, whether transmission of the data sub-packets meets a delay requirement. The method further includes, in response to detecting that the transmission of the data sub-packets does not meet the delay requirement, stopping transmitting remaining data sub-packets obtained by splitting the data packet of the interactive service to the subsequent node.

In an embodiment, a non-transitory computer-readable storage medium stores computer-readable instructions thereon which, when executed by a computer device, cause the computer device to perform a data transmission method. The data transmission method includes receiving a UE Route Selection Policy (URSP) rule transmitted by an Access and Mobility Management Function (AMF), the URSP rule containing a timeout abandoning policy for data sub-packets obtained by splitting a data packet of an interactive service. The method further includes, in response to identifying, according to indication information contained in a data packet transmitted by a next generation nodeB, that the data packet is one of the data sub-packets obtained by splitting the data packet of the interactive service, detecting a receiving delay for the data sub-packets according to the URSP rule in a process of receiving the data sub-packets obtained by splitting the data packet of the interactive service. The method further includes, in response to a determination that all data sub-packets obtained by splitting the data packet of the interactive service are not completely received within a set duration, discarding previously received data sub-packets obtained by splitting the data packet of the interactive service.

In an embodiment, a non-transitory computer-readable storage medium stores computer-readable instructions thereon which, when executed by a computer device, cause the computer device to perform a data transmission method. The data transmission method includes receiving configuration information, transmitted by an Application Function (AF), for a data packet of an interactive service, the configuration information containing a delay parameter of the data packet of the interactive service. The method further includes generating a UE Route Selection Policy (URSP) rule and Protocol Data Unit (PDU) session management policy information according to the configuration information. The URSP rule contains a timeout abandoning policy for data sub-packets obtained by splitting the data packet of the interactive service, and the PDU session management policy information instructs transmission delay monitoring to be performed on the data sub-packets. The method further includes transmitting the URSP rule to an Access and Mobility Management Function (AMF) such that the AMF forwards the URSP rule to a user equipment and configures, according to the URSP rule, access stratum context information to a next generation nodeB. The access stratum context information instructs transmission delay monitoring to be performed on the data sub-packets obtained by splitting the data packet of the interactive service. The method further includes transmitting the PDU session management policy information to a Session Management Function (SMF) such that the SMF configures the PDU session management policy information to a user plane function.

The computer-readable medium shown in the embodiments of this disclosure may be a computer-readable signal medium or a computer-readable storage medium or any combination thereof. The computer-readable storage medium may be, for example, but is not limited to, an electric, magnetic, optical, electromagnetic, infrared, or semi-conductive system, apparatus, or device, or any combination thereof. A more specific example of the computer-readable storage medium may include but is not limited to: an electrical connection having one or more wires, a portable computer magnetic disk, a hard disk, a RAM, a ROM, an erasable programmable read-only memory (EPROM), a flash memory, an optical fiber, a compact disc read-only memory (CD-ROM), an optical storage device, a magnetic storage device, or any appropriate combination thereof. In this disclosure, the computer-readable storage medium may be any tangible medium including or storing computer-readable instructions, and the computer-readable instructions may be used by or in combination with an instruction execution system, apparatus, or device. In this disclosure, the computer-readable signal medium may include a data signal transmitted in a baseband or as part of a carrier, and stores computer-readable instructions. A data signal propagated in such a way may assume a plurality of forms, including, but not limited to, an electromagnetic signal, an optical signal, or any appropriate combination thereof. The computer-readable signal medium may be further any computer-readable medium in addition to a computer-readable storage medium. The computer-readable medium may send, propagate, or transmit computer-readable instructions that are used by or used in combination with an instruction execution system, apparatus, or device. The computer-readable instructions included in the computer-readable medium may be transmitted by using any suitable medium, including but not limited to: a wireless medium, a wire, or the like, or any suitable combination thereof.

The flowcharts and block diagrams in the accompanying drawings illustrate possible system architectures, functions, and operations that may be implemented by a system, a method, and a computer program product according to various embodiments of this disclosure. Each box in a flowchart or a block diagram may represent a module, a computer-readable instruction segment, or a part of code. The module, the computer-readable instruction segment, or the part of code includes one or more executable instructions used for implementing specified logic functions. In some implementations used as substitutes, functions annotated in boxes may alternatively occur in a sequence different from that annotated in an accompanying drawing. For example, two boxes shown in succession may actually be performed basically in parallel, and sometimes the two boxes may be performed in a reverse sequence. This is determined by a related function. Each block in the block diagram or the flowchart, and a combination of blocks in the block diagram or the flowchart may be implemented by using a dedicated hardware-based system that performs a specified function or operation, or may be implemented by using a combination of dedicated hardware and computer instructions.

Related units described in the embodiments of this disclosure may be implemented in a software manner, or may be implemented in a hardware manner, and the unit described can also be set in a processor (including processing circuitry). Names of these units do not constitute a limitation on the units in a case.

According to another aspect, this disclosure further provides a computer-readable medium (including a non-transitory computer-readable storage medium storing computer-readable instructions). The computer-readable medium may be included in the electronic device described in the foregoing embodiments, or may exist alone and is not assembled in the electronic device. The computer-readable medium carries one or more computer-readable instructions, the one or more computer-readable instructions, when executed by the electronic device, causing the electronic device to implement the method described in the foregoing embodiments.

Although several modules or units of a device for action execution are mentioned in the foregoing detailed descriptions, the division is not mandatory. Actually, according to the implementations of this disclosure, the features and functions of two or more modules or units described above may be specified in one module or unit. Conversely, the features and functions of one module or unit described above may be further divided into a plurality of modules or units to be embodied.

Through the descriptions of the foregoing implementations, a person skilled in the art easily understands that the exemplary implementations described herein may be implemented through software, or may be implemented through software located in combination with necessary hardware. Therefore, the technical solutions of the embodiments of this disclosure may be implemented in a form of a software product. The software product may be stored in a non-volatile storage medium or on the network, including several instructions for instructing a computing device to perform the methods according to the embodiments of this disclosure. The non-volatile storage medium may be, for example, a CD-ROM, a USB flash disk, or a mobile hard disk. The computing device may be a personal computer, a server, a touch-control terminal, or a network device.

After considering the specification and practicing the implementations of the present disclosure, a person skilled in the art may easily conceive of other implementations of this disclosure. This disclosure is intended to cover any variation, use, or adaptive change of this disclosure. These variations, uses, or adaptive changes follow the general principles of this disclosure and include common general knowledge or common technical means in the art that are not disclosed in this disclosure.

The term module (and other similar terms such as unit, submodule, etc.) in this disclosure may refer to a software module, a hardware module, or a combination thereof. A software module (e.g., computer program) may be developed using a computer programming language. A hardware module may be implemented using processing circuitry and/or memory. Each module can be implemented using one or more processors (or processors and memory). Likewise, a processor (or processors and memory) can be used to implement one or more modules. Moreover, each module can be part of an overall module that includes the functionalities of the module.

The foregoing disclosure includes some exemplary embodiments of this disclosure which are not intended to limit the scope of this disclosure. Other embodiments shall also fall within the scope of this disclosure.

What is claimed is:

1. A data transmission method, comprising:
   receiving policy information transmitted by a core network device and related to a Protocol Data Unit (PDU) session, the policy information instructing transmission delay monitoring to be performed on data sub-packets obtained by splitting a data packet of an interactive service;
   in response to identifying that a data sub-packet transmitted by a previous node is one of the data sub-packets obtained by splitting the data packet of the interactive service, detecting, according to the policy information in a process of transmitting the data sub-packets to a subsequent node, whether transmission of the one of the data sub-packets meets a delay requirement; and in response to detecting that the transmission of the one of the data sub-packets does not meet the delay requirement, stopping transmitting remaining data sub-packets subsequent to the one of the data sub-packets obtained by splitting the data packet of the interactive service to the subsequent node.

2. The data transmission method according to claim 1, further comprising:
in response to detecting that the transmission of the data sub-packets does not meet the delay requirement, discarding previously received data sub-packets obtained by splitting the data packet of the interactive service.

3. The data transmission method according to claim 1, further comprising:
transmitting feedback information to the previous node in response to detecting that the transmission of the data sub-packets does not meet the delay requirement, the feedback information instructing the previous node to stop transmitting the data sub-packets obtained by splitting the data packet of the interactive service.

4. The data transmission method according to claim 3, wherein the transmitting the feedback information comprises:
transmitting the feedback information to the previous node in response to a determination that all the data sub-packets obtained by splitting the data packet of the interactive service are not completely received.

5. The data transmission method according to claim 1, wherein
the data sub-packets obtained by splitting the data packet of the interactive service comprise a start data packet and an end data packet;
the start data packet contains first indication information indicating that the start data packet is transmitted first among the data sub-packets; and
the end data packet contains second indication information indicating that the end data packet is transmitted last among the data sub-packets.

6. The data transmission method according to claim 1, further comprising:
identifying, according to indication information contained in a protocol field of a received data packet, whether the received data packet is the one of the data sub-packets obtained by splitting the data packet of the interactive service; or
identifying, according to indication information contained in payload information of the received data packet, whether the received data packet is the one of the data sub-packets obtained by splitting the data packet of the interactive service.

7. The data transmission method according to claim 1, further comprising:
in response to a determination that all the data sub-packets transmitted by the previous node and obtained by splitting the data packet of the interactive service are not completely received within a set duration, stopping transmitting the data sub-packets obtained by splitting the data packet of the interactive service to the subsequent node, and discarding previously received data sub-packets obtained by splitting the data packet of the interactive service.

8. The data transmission method according to claim 1, wherein:
the policy information is received by a user plane function, the previous node comprises an application server, the subsequent node comprises a next generation nodeB, and the core network device comprises a Session Management Function (SMF), and the receiving the policy information comprises receiving PDU session management policy information transmitted by the SME; or
the policy information is received by the next generation nodeB, the previous node comprises the user plane function, the subsequent node comprises a user equipment, and the core network device comprises an Access and Mobility Management Function (AMF), and the receiving the policy information comprises receiving access stratum context information transmitted by the AMF.

9. The data transmission method according to claim 1, further comprising
after the stopping transmitting the remaining data sub-packets subsequent to the one of the data sub-packets obtained by splitting the data packet of the interactive service, transmitting data sub-packets obtained by splitting a next data packet of the interactive service to the subsequent node.

10. The data transmission method according to claim 9, wherein the next data packet of the interactive service is a retransmission of the data packet of the interactive service.

11. A data transmission apparatus, comprising:
processing circuitry configured to
receive policy information transmitted by a core network device and related to a Protocol Data Unit (PDU) session, the policy information instructing transmission delay monitoring to be performed on data sub-packets obtained by splitting a data packet of an interactive service;
in response to identifying that a data sub-packet transmitted by a previous node is one of the data sub-packets obtained by splitting the data packet of the interactive service, detect, according to the policy information in a process of transmitting the data sub-packets to a subsequent node, whether transmission of the one of the data sub-packets meets a delay requirement; and
in response to detecting that the transmission of the one of the data sub-packets does not meet the delay requirement, stop transmission of remaining data sub-packets subsequent to the one of the data sub-packets obtained by splitting the data packet of the interactive service to the subsequent node.

12. The data transmission apparatus according to claim 11, wherein the processing circuitry is further configured to:
in response to detecting that the transmission of the data sub-packets does not meet the delay requirement, discard previously received data sub-packets obtained by splitting the data packet of the interactive service.

13. The data transmission apparatus according to claim 11, wherein the processing circuitry is further configured to:
transmit feedback information to the previous node in response to detecting that the transmission of the data sub-packets does not meet the delay requirement, the feedback information instructing the previous node to stop the transmission of the data sub-packets obtained by splitting the data packet of the interactive service.

14. The data transmission apparatus according to claim 13, wherein the processing circuitry is further configured to:
transmit the feedback information to the previous node in response to a determination that all the data sub-packets obtained by splitting the data packet of the interactive service are not completely received.

15. The data transmission apparatus according to claim 11, wherein
the data sub-packets obtained by splitting the data packet of the interactive service comprise a start data packet and an end data packet;
the start data packet contains first indication information indicating that the start data packet is transmitted first among the data sub-packets; and
the end data packet contains second indication information indicating that the end data packet is transmitted last among the data sub-packets.

16. The data transmission apparatus according to claim 11, wherein the processing circuitry is further configured to:
identify, according to indication information contained in a protocol field of a received data packet, whether the received data packet is the one of the data sub-packets obtained by splitting the data packet of the interactive service; or
identify, according to indication information contained in payload information of the received data packet, whether the received data packet is the one of the data sub-packets obtained by splitting the data packet of the interactive service.

17. The data transmission apparatus according to claim 11, wherein the processing circuitry is further configured to:
in response to a determination that all the data sub-packets transmitted by the previous node and obtained by splitting the data packet of the interactive service are not completely received within a set duration, stop the transmission of the data sub-packets obtained by splitting the data packet of the interactive service to the subsequent node, and discard previously received data sub-packets obtained by splitting the data packet of the interactive service.

18. The data transmission apparatus according to claim 11, wherein
the previous node comprises an application server, the subsequent node comprises a next generation nodeB, and the core network device comprises a Session Management Function (SMF), and the processing circuitry is configured to receive the policy information that includes PDU session management policy information transmitted by the SMF via a user plane function; or
the previous node comprises the user plane function, the subsequent node comprises a user equipment, and the core network device comprises an Access and Mobility Management Function (AMF), and the processing circuitry is configured to receive the policy information that includes access stratum context information transmitted by the AMF via the next generation nodeB.

19. The data transmission apparatus according to claim 11, wherein the processing circuitry is further configured to:
after the transmission of the remaining data sub-packets subsequent to the one of the data sub-packets obtained by splitting the data packet of the interactive service is stopped, transmit data sub-packets obtained by splitting a next data packet of the interactive service to the subsequent node.

20. A non-transitory computer-readable storage medium storing computer-readable instructions thereon, which, when executed by processing circuitry, cause the processing circuitry to perform a data transmission method comprising:
receiving policy information transmitted by a core network device and related to a Protocol Data Unit (PDU) session, the policy information instructing transmission delay monitoring to be performed on data sub-packets obtained by splitting a data packet of an interactive service;
in response to identifying that a data sub-packet transmitted by a previous node is one of the data sub-packets obtained by splitting the data packet of the interactive service, detecting, according to the policy information in a process of transmitting the data sub-packets to a subsequent node, whether transmission of the one of the data sub-packets meets a delay requirement; and
in response to detecting that the transmission of the one of the data sub-packets does not meet the delay requirement, stopping transmitting remaining data sub-packets subsequent to the one of the data sub-packets obtained by splitting the data packet of the interactive service to the subsequent node.

\* \* \* \* \*